United States Patent [19]

Farber

[11] 4,400,847
[45] Aug. 30, 1983

[54] SELF-CLAMPING HINGE FOR SOLAR COLLECTOR FRAMES AND THE LIKE

[75] Inventor: Webb W. Farber, Hampton, Fla.

[73] Assignee: U.S. Solar Corporation, Hampton, Fla.

[21] Appl. No.: 288,086

[22] Filed: Jul. 29, 1981

[51] Int. Cl.³ .............................................. E05D 3/02
[52] U.S. Cl. ...................................... 16/223; 16/262; 16/265; 16/271; 16/362; 16/366; 16/387; 16/DIG. 29
[58] Field of Search ........ 16/DIG. 29, 223, DIG. 40, 16/262, 265, 271, 272, 362, 366, 382, 383, 384, 387, 282, 285, 287, 292, 294, 295, 296, 297, 302, 357, 361, 380, 381; 136/243, 244, 245; 126/450, 417, 426

[56] References Cited

U.S. PATENT DOCUMENTS 1,782,582 11/1930 Raymond .......................... 16/381 X
2,591,984  4/1952 Walsh ..................................... 16/271
4,237,577 12/1980 Chapel ........................ 16/DIG. 29 X

FOREIGN PATENT DOCUMENTS 670172  4/1952 United Kingdom ......... 16/DIG. 29

Primary Examiner—Mark Rosenbaum
Attorney, Agent, or Firm—Ernest H. Schmidt

[57] ABSTRACT

A pair of male and female hinge halves fabricated of extruded metal sections having complemental cross-sectional shapes so as to slidingly interfit and interhookingly engage with one another define a longitudinally extending through opening at one transverse side for the reception of a hinge pin, and interhooking means at the opposite side for interhooking engagement with the complementary shape of an extruded metal frame member of a solar collector frame or the like to be adjustably supported. The interhooking engagement between the hinge halves provides a limited movement fulcrum between the two transverse sides serving to clamp the opposite side interhooking means in secure frictional abutment with the extruded metal frame member when the hinge pin is force-fitted into its through opening.

6 Claims, 3 Drawing Figures

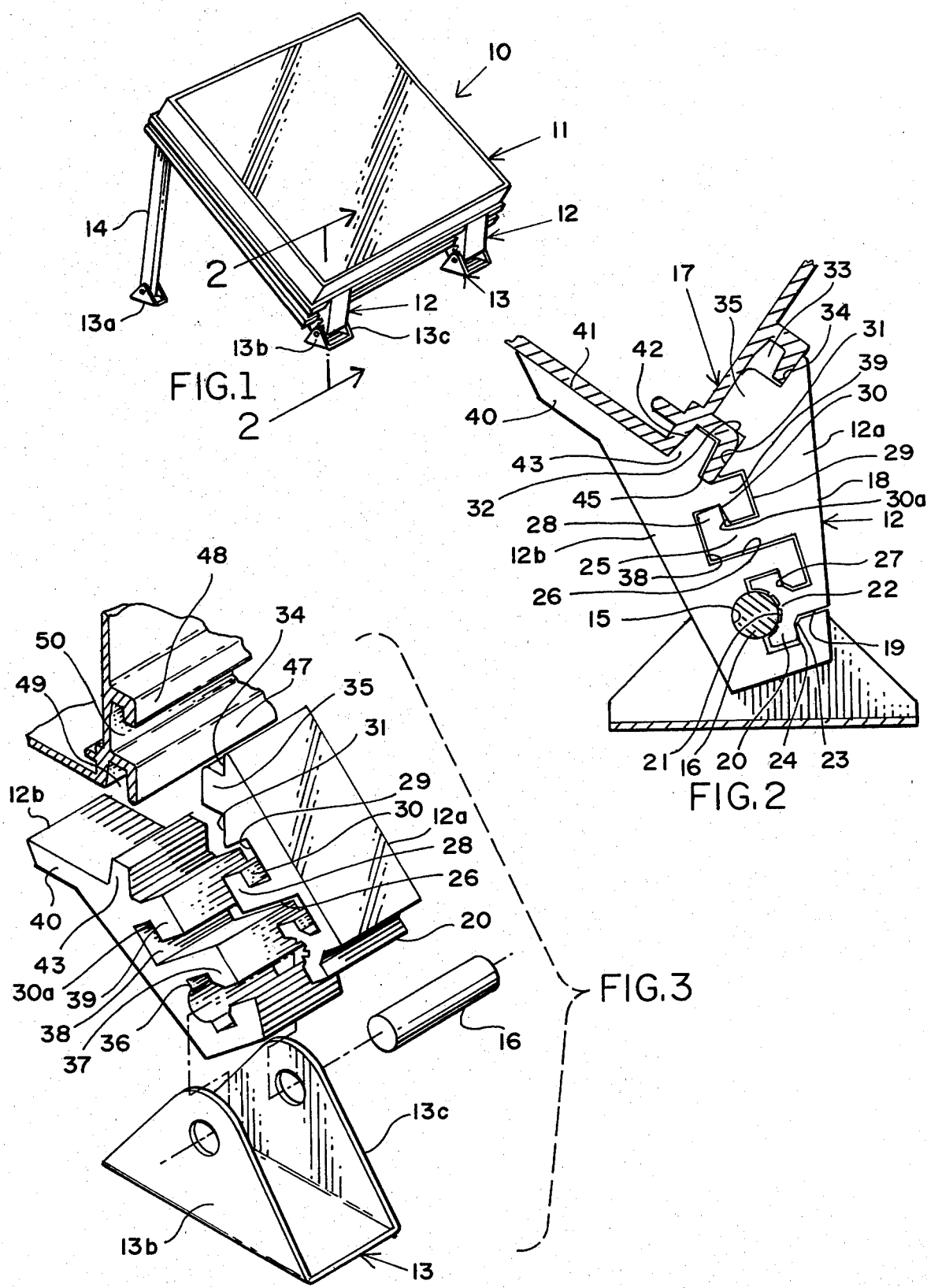

SELF-CLAMPING HINGE FOR SOLAR COLLECTOR FRAMES AND THE LIKE

BACKGROUND OF THE INVENTION

This invention relates to hinge mechanisms for adjustably supporting the sides of rectangular collector frames or the like to provide for adjustable positioning upon installation, and is directed particularly to a self-clamping hinge cooperative with the cross-sectional shape of the sidewall of the frame to be secured, to provide for secure attachment without the use of bolts, screws or the like.

Various types of hinge devices for adjustably supporting a rectangular solar collector frame or the like to a roof or other supporting structure are known. Such hinge-like supporting devices, for the most part, required machine screws or bolts to assemble the hinge parts to one another and to the framework of the solar collector to be adjustably supported. Those hinge devices heretofore devised for automatic self-clamping between the frame member and a hinge pin without the use of screws or bolts and by relative axial sliding interfit, are deficient in one way or another, principally in that they do not lock securely to the frame member upon insertion of the hinge pin used for pivotal attachment to the supporting bracket. This often results in sideways slippage or vibration of the associated solar collector in windy conditions.

SUMMARY OF THE INVENTION

It is the principal object of this invention to obviate the deficiencies of self-clamping hinges for solar collector frames and the like heretofore known by the provision of means, cooperative with the installation of the hinge pin used for mounting to a supporting bracket, to forcefully clamp the hinge parts to one another and to the framework attached to, while at the same time retaining the installed hinge pin securely in place.

A more particular object of the invention is to provide a self-clamping hinge of the character described comprising a pair of male and female hinge halves fabricated of extruded metal sections having complemental cross-sectional shapes so as to slidingly interfit and interhookingly engage with one another in such a manner and loosely enough to provide a central, transverse fulcrum about which the hinge halves can rock, and defining together a transversely extending through opening at one side for the reception of a hinge pin, and means at the opposite side for interhooking and interclamping engagement with the complemental shape of an extruded metal frame member to be adjustably supported, whereby, upon the force fitting of a hinge pin into its through opening, the interhooking and interclamping means will be brought into secure frictional abutting contact with the extruded metal frame member.

Another object of the invention is to provide a self-clamping hinge of the above nature which can be inexpensively fabricated of extruded aluminum for economy of manufacture, which can be easily assembled to a solar collector frame or the like with a minimum use of hand tools, and which will be dependable and durable in use.

Other objects, features and advantages of the invention will be apparent from the following description when read with reference to the accompanying drawings.

BRIEF DESCRIPTION OF THE DRAWINGS

In the drawings, wherein like reference numerals denote corresponding parts throughout the several views:

FIG. 1 illustrates, in perspective, a solar collector panel utilizing self-clamping hinges embodying the invention for adjustably securing the framework to a supporting surface;

FIG. 2 is a vertical cross-sectional view taken along the plane indicated at 2—2 of FIG. 1 and illustrating, on an enlarged scale, constructional details of a self-clamping hinge and how it interconnects between portions of the solar panel framework and a mounting bracket; and FIG. 3 is an "exploded" view of the hinge parts and a portion of the solar panel framework, illustrating how they slidingly interfit upon assembly.

Referring now in detail to the drawings, reference numeral 10 designates, generally, a typical hot-water solar panel comprising an extruded metal frame 11 supported along its lower edge by a pair of spaced self-clamping hinges 12 embodying the invention. The hinges 12 are pivotally joined to supporting brackets 13 for attachment to a flat supporting surface, such as the roof of a house. The upper edge of the solar panel framework is supported by posts 14 pivotally connected at their lower ends to brackets 13a, (only one illustrated) the upper ends of said support posts being pivotally joined to the solar collector panel framework by self-clamping hinges 12 (not illustrated). The length of the supporting posts 14 is determined by the slope of the surface on which the solar panel is to be mounted, and the degree of inclination desired of the outer face of the solar panel for best interception of the radiant energy of the sun at the particular location of the installation. As hereinafter more particularly described, the self-clamping hinge 12 serves not only to grip firmly to the solar panel framework upon installation without the use of screws, bolts or the like, but also permits full pivotal adjustment by hinge action to the desired angle of inclination for the installation to be made.

As best illustrated in FIGS. 2 and 3, the self-clamping hinge 12 comprises a pair of interlocking male and female hinge halves 12a, 12b, respectively, which will prefereably be fabricated of sections of extruded aluminum of such cross-sectional configurations that they interfit slidingly, but somewhat loosely, in the manner and for the purpose hereinafter more particularly described. When slidingly assembled, moreover, the hinge halves 12a and 12b, define, at one end, a transverse cylindrical opening 15 for the reception of a bracket mounting hinge pin 16 and, at the opposite end, a transversely-extending portion having a cross-sectional shape that slidingly fits, for interconnection therewith, a complementary, lower wall corner section 17 of the solar panel framework to be attached to.

The male hinge half 12a is flat along one side, as indicated at 18, and at its outer end extends through laterally offset neck portion 19 into a substantially rectangular head portion 20, the outer surface of which is formed therealong with a semi-cylindrical recess 21. The wall surface of the recess 21 is formed therealong with a plurality of small, angular, gripping projections 22, for the purpose hereinafter described. The neck and head portions 19, 20, define, at the outer end of the male hinge half 12a, a recess 23 providing a shoulder 24 along the underside of said head portion. The inner end of the head portion 20 defines, together with projection 25 spaced laterally inward of said head portion, an L-shaped recess 26, defining a shoulder 27 opposite the shoulder 24 at the underside of head portion 20. The projection 25, terminates at its outer end, in an inwardly-projecting, rectangular, hook portion 28 defining a rectangular opening 29 providing a shoulder portion 30 at the underside of said rectangular hook portion. The inner end of the rectangular opening 29 merges, at an acute angle, with a flat surface portion 31, the inner end of which meets a relatively right-angular surface portion 32. A substantially rectangular recess 33 along the inner end and at the outside of the male hinge half 12a has a surface portion 34 lying in the same plane as flat surface portion 31 and defines, with right-angular surface portion 32, a rectangular projection 35.

The female hinge half 12b is complemental in shape with the above described male hinge half 12a, being provided with a rectangular recess 36 for the reception of rectangular head and neck portion 20, 19, respectively, an L-shaped projection 37 for reception in L-shaped recess 26, an L-shaped recess 38 for the reception of rectangular hook portion 28, and an L-shaped projection 39 for reception in the rectangular opening 29. It is to be particularly noted that the L-shaped projection 39 defines a slightly beveled under-surface or shoulder 30a the inner corner of which is in abutting contact with the outer end of shoulder portion 30 of the male hinge half 12a to serve as a fulcrum about which the two hinge halves can rock or pivotally rotate to a degree sufficient to securely clamp the assemblage to the solar collector framework upon installation of the hinge pin 16, as is hereinafter more particularly described.

The female hinge half 12b is also integrally formed, at its inner end, with an angularly-offset extension portion 40 providing, at its inside, a flat surface portion 41. The inner end of the flat surface portion 41 terminates in an inwardly-extending side wall portion 42 of a substantially rectangular but slightly tapered projection 43. The opposite side wall portion 44 of projection 43 terminates in a short, flat surface portion 45 which merges with the inner side wall surface, at the outer end, of the L-shaped projection 39. The rectangular recess 36, along the bottom wall thereof, is formed with a semi-circular recess 46 complemental with semi-circular recess 21 in the male hinge half 12a to provide a cylindrical opening for the sliding reception therein of the hinge pin 16 in the manner and for the purpose hereinafter more particularly described.

In use, the complemental extruded shapes of the male and female hinge halves 12a and 12b, respectively, allow them to be slidingly interfitted, in relatively loose interhooking engagement with one another, and when so interhookingly engaged, to define the cylindrical through opening 15 for the close fitting reception of hinge pin 16. In addition to interlocking with one another upon interfitting assembly, as hereinafter described, the hinge halves provide means for simultaneously interconnecting and securely interclamping with the lower wall section of the solar panel framework 17, as illustrated in FIG. 2. To this end, as best illustrated in FIG. 3, the lower wall portion of the solar panel framework to which the hinge is to be attached, also preferably fabricated of extruded aluminum, is formed at the outside along its length and near the bottom corner with a pair of spaced, parallel, L-shaped projections 47, 48 defining therealong substantially rectangular recesses 49 and 50, respectively. As best illustrated in FIG. 2, upon assembly of the self-clamping hinge to the solar collector framework, the substantially rectangular projection 43 of female hinge half 12b is received in solar panel framework recess 49, and the rectangular projection 35 of male hinge half 12a is received in the substantially rectangular recess between the L-shaped projections 47 and 48 of the solar panel framework. It will be apparent from FIG. 2 that assembly of self-clamping hinge to the solar panel framework is accomplished simply by placing the male hinge half 12a so that the rectangular projection 35 is fully seated in the opening between the L-shaped projections 47 and 48, then placing the female hinge section 12b so that the substantially rectangular projection 43 is received fully within framework recess 49 with the flat surface portion 41 abutting the underside or bottom surface of the solar panel, at a position longitudinally offset from the position of male hinge half 12a, and then, while in such position, slidingly interfitting the hinge halves together and into interengaging relation. When a pair of the hinge sets are so assembled to the solar panel framework, in proper spaced relationship as illustrated in FIG. 1, the outer ends of the assembled hinges will be placed between the spaced upright walls 13b, 13c of a support bracket 13 having laterally opposed hinge-pin openings, whereafter a hinge pin 16 can be driven in place through the bracket openings and the cylindrical opening in the assembled hinge for pivotal or hinging interconnection with the brackets. In this connection, it is to be particularly understood that the angular projections 22 along the inner surface of the male hinge half semi-circular recess 21 render the hinge pin opening 15 somewhat undersize so that when the hinge pin 16 is driven into place, the two hinge halves will rock slightly about the fulcrum defined by the abutting shoulders 30, 30a intermediate the inner and outer ends of the hinge assemblage. The flat surface portion 41 of female hinge half 12b is thereby constrained against an under-surface portion of the solar panel framework 17, while at the same time constraining the outer surface of male hinge half projection 35 against the adjacent side surface portion of said framework to securely clamp the assemblage in place. The driving in of the pivot pin 16 therefore not only serves to retain it securely in place, but also clamps the hinge assemblage to the solar panel framework securely enough to preclude slippage or vibration under even the most severe wind conditions. Moreover, the dimension tolerances of the hinge halves 12a, 12b, and those of the solar panel framework section to be attached to are such that upon the driving in of the hinge pin as described above, the shoulders 24, 27 of the male hinge half head portion 20 will just seat upon the opposed shoulders defined by the rectangular recess 36 in female hinge half 12b.

While I have illustrated and described herein only one form in which my invention can be conveniently embodied in practice, it is to be understood that this embodiment is presented by way of example only, and not in a limiting sense. The invention, in brief, comprises all the embodiments and modifications coming within the scope and spirit of the following claims.

What I claim as new and desire to secure by Letters Patent is:

1. In a self-clamping hinge for use in pivotally mounting a solar collector panel to a roof or other surface, the combination comprising, a rectangular solar panel framework formed along the outside with hinge interengagement means along its length, a pair of male and female hinge halves each having two mutually opposed ends and being fabricated of extruded metal sections, and having means along their lengths and between their ends operative to slidingly interfit and loosely interhookingly engage with one another, a head portion extending outwardly to one side of said male hinge half at one of said ends thereof, said head portion having an outer surface, the outer surface of said head portion having a first transversely-extending, semi-circular recess, one side of said female hinge half at one of said ends thereof having a second transversely-extending, semi-cylindrical recess defining, together with said first semi-cylindrical recess when said pair of male and female hinge halves are interhookingly engaged with one another, a cylindrical hinge pin opening, said slidingly interfitting means comprising a fulcrum intermediate the ends of said male and female hinge halves upon the sliding interfitting thereof providing for limited mutually rotative motion about said fulcrum of said hinge halves, a cylindrical hinge pin, said cylindrical hinge pin opening being of such size and said hinge pin being of such diameter as to constrain the other of said ends of said male and female hinge halves towards one another about said fulcrum upon the force fitting of said pivot pin within said hinge pin opening, the other of said ends of said male and female hinge halves comprising means for clamping attachment to the hinge interengagement means of the framework upon the sliding interfitting of said male and female hinge halves and subsequent force fitting of said pivot pin.

2. A self-clamping hinge as defined in claim 1 wherein one of said transversely-extending, semi-cylindrical recesses is formed with a plurality of transverse hinge pin gripping projections.

3. A self-clamping hinge as defined in claim 2 wherein said slidingly interfitting means comprises an L-shaped projection extending outwardly of said one side of said male hinge half and receivable in a complemental L-shaped recess in said one side of said female hinge half, and an L-shaped projection extending outwardly of said one side of said female hinge half receivable in a complemental L-shaped opening in said one side of said male hinge half.

4. A self-clamping hinge as defined in claim 1 wherein said slidingly interfitting means comprises an L-shaped projection extending outwardly of one side of one of said hinge halves and receivable in a complemental L-shaped recess in one side of the other of said hinge halves.

5. A self-clamping hinge as defined in claim 4 wherein said clamping attachment means comprises a projection at the other end of each of said male and female hinge halves receivable within the hinge interengagement means of the solar collector panel framework.

6. A self-clamping hinge as defined in claim 5 including a U-shaped bracket defining a recess for the reception of said one end of said male and female hinge halves upon their being slidingly interfitted, said bracket being provided with opposed hinge pin openings for pivotally journalling outwardly-extending end portions of said hinge pin received in said cylindrical hinge pin opening.

* * * * *